United States Patent [19]

Giammarco et al.

[11] 4,146,569
[45] Mar. 27, 1979

[54] PROCESS FOR REMOVING GASEOUS IMPURITIES FROM A GASEOUS MIXTURE CONTAINING THE SAME

[76] Inventors: Giuseppe Giammarco; Paolo Giammarco, both of San Marco 3242, Palazzo Morolin, Venice, Italy

[21] Appl. No.: 815,331

[22] Filed: Jul. 13, 1977

[30] Foreign Application Priority Data

Jul. 13, 1976 [IT] Italy ............................. 68750 A/76

[51] Int. Cl.$^2$ .......................................... B01D 53/34
[52] U.S. Cl. ................... 423/222; 423/223; 423/226; 423/229; 423/232; 423/236; 423/242; 423/243
[58] Field of Search .............. 423/210, 220, 226, 228, 423/229, 232, 236, 222, 223, 242, 243

[56] References Cited

U.S. PATENT DOCUMENTS

| | | |
|---|---|---|
| 2,134,507 | 10/1938 | Cooke .................................. 423/232 |
| 3,307,844 | 6/1962 | Giammarco ......................... 423/437 |
| 3,725,529 | 4/1973 | Giammarco et al. ............. 423/223 X |
| 3,962,404 | 6/1976 | Giammarco et al. ............. 423/223 X |

Primary Examiner—Earl C. Thomas
Attorney, Agent, or Firm—Sughrue, Rothwell, Mion, Zinn and Macpeak

[57] ABSTRACT

Process for removing gaseous impurities such as $CO_2$, $H_2S$, HCN and $SO_2$ from a gaseous mixture containing the same, comprising an absorption step in which the gaseous impurities are removed by a scrubbing solution, and a regeneration step in which the exhausted solution is submitted to stripping to remove the inpurities. The regenerated solution is treated with a flow of inert gases to improve the degree of regeneration and extract heat from said solution. The flow of inert gases, containing steam and desorbed impurities, is further enriched in steam supplied from the exterior and the resulting mixture is used as stripping means in the regeneration step.

17 Claims, 7 Drawing Figures

PROCESS FOR REMOVING GASEOUS IMPURITIES FROM A GASEOUS MIXTURE CONTAINING THE SAME

The present invention relates to purification processes in which gaseous mixtures containing various impurities such as $CO_2$, $H_2S$, $HCN$, $SO_2$ and the like, separately or together, are brought into contact, in an absorption step, with an absorbing solution of suitable chemical composition which removes the said impurities from the gaseous mixture, after which the solution is conveyed to a regeneration step carried out at elevated temperature, in order to expel the impurities previously absorbed. The solution thus regenerated is then recycled.

As is known, the absorbing solutions used in the art for the above purpose, are solutions of alkali metal carbonates, either alone or activated by addition of $As_2O_3$, glycine or similar aminoacids, or ethanolamine; other solutions used are those of alkali metal phosphates, borates and phenates, solutions or ethanolamine in water or in sulpholane, sulphite and bisulphite solutions (in the case of the absorption of $SO_2$), organic liquids for dissolving hydrocarbons and the like.

The object of the present invention is to reduce the consumption of heat which is supplied from the outside for carrying out the processes discussed above, and more precisely the object is to recover the heat contained in the regenerated solutions issuing from the regeneration column and to transfer it back to the regeneration column thereby to reuse it.

Many methods and devices have been proposed for the recovery and re-utilization of the said heat. Among these methods it is suitable to mention the so-called ejector method in which the regenerated solution withdrawn from the regeneration column is subjected, in a suitable chamber, to a reduction in pressure created by a vapour ejector (or thermocompressor) which sucks vapour from the solution and delivers it under pressure to the regeneration column.

The aforesaid method has various disadvantages. Thus, for example, the quantity of heat recovered is low (generally corresponding to cooling of the solution by 10° C.); the motive vapour conveyed to the ejector must be at a rather high pressure (about 4.5–5 atm) and, moreover, this vapour upsets the balance of the water content in the solution circulating in the plant; it also has the disadvantage that the resulting apparatus is complex and costly, requiring among other things, a large chamber at a lower pressure than that of the regeneration column for the extraction of the vapour from the solution by means of a pressure reduction produced by the ejector described above.

The said disadvantages are eliminated by the method of the present invention which consists of treating the solution at the outlet of the usual regeneration column in a zone at the same pressure as the latter, with a weak current of inert gases, which desorb residual impurities still contained in the solution, thus improving the degree of regeneration, while extracting and recovering a considerable part of the heat contained therein, and yielding a mixture of steam, inert gases and desorbed impurities. To this mixture there is added, in a subsequent zone, a further amount of heat or steam from an external source, which increases the quantity of steam contained therein; the mixture thus obtained is conveyed into the regeneration column, where it is brought into contact with the exhausted solution coming from the absorption step. Therefore, this method is named "method of regeneration with heat return to the (regeneration) column by means of a current of inert gas."

This method, as will be better specified further on, as well as being simple and economic, has many advantages: the first is that a considerable quantity of heat, much more abundant than by the ejector method of the known prior art is recovered, and reused, whereby the consumption of heat in the operation of the cycle is notably reduced and at times, up to about half of that necessary in conventional methods; moreover, it has the advantage of not requiring high-pressure steam as in the ejector method and finally it has the characteristic that small quantities of inert gases are sufficient to carry considerable quantities of steam back into the column. Another advantage lies in the fact that the inert gases discussed above, because of their desorbing power, improve the regeneration of the solution.

The disadvantages deriving from the pollution of the gaseous impurities (and particularly $CO_2$) desorbed from the regeneration column by the inert gas, are to a large part and satisfactorily avoided by means of the embodiments which will be described hereinafter with reference to FIG. 3.

The inert gases usable in the process of the present invention are those which are compatible chemically with the absorbing solution and with the gaseous mixture to be purified. The inert gases may be nitrogen (available in plants utilizing liquid nitrogen for scrubbing purposes or from partial combustion processes), purge gases from the synthesis of $NH_3$ and the like, methane for reforming or partial combustion, combustible gases used in Claus furnaces, and lastly air, especially when a non-activated alkali metal carbonate solution is used.

The present invention may be used in many forms, and in particular.

in the scheme of FIG. 1, relating to a one-stage cycle.

in the scheme of FIG. 2 in which the one-stage cycle is improved by cooling one part of the solution thoroughly with consequent increased recovery of heat.

in the scheme of FIG. 3 relating to a one-stage cycle, but with the production of a large part of the $CO_2$ (or other desorbed impurities) in the pure state, without pollution by the inert gases.

in the scheme of FIG. 4, using a special method of heat recovery.

in the scheme of FIG. 5, similar to that of FIG. 3 but with a two-stage cycle.

in the scheme of FIG. 6, with absorption at reduced temperature improved by heat recovery in the upper part of the regenerator.

Figure 1:
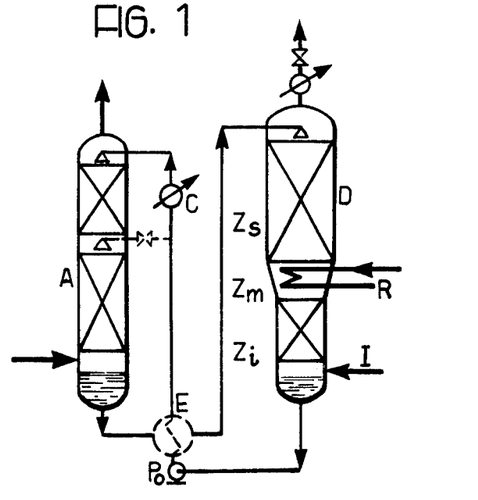

(1) The more usual embodiment of the present process, is, represented in FIG. 1, which relates to a one-stage purifying cycle. In this embodiment, the absorption column A functions as is known in the art, that is, the solution is fed by means of the pump Po according to the conventional scheme (through heat exchanger E and cooler C), or in the form of a split-stream; the regenation step is carried out in a regeneration column D, subdivided into three successive zones, in which the exhausted absorbing solution coming from the absorption step is treated in counter-current with a gaseous desorbing mixture consisting of steam and inert gases, as follows:

(a) A current of inert gases I as defined above is fed into the lowest zone Zi, and is brought into contact with the solution in order to extract heat from the solution which flows through this lowest zone, thus being humidified and preheated, and to complete the extraction of the impurities contained in the solution, thus improving the degree of regeneration, as specified further on at paragraph 8).

(b) The gaseous mixture of water vapour and inert gases is conveyed to the intermediate zone Zm, where heat or steam is supplied from the exterior, whereby the water vapour content and temperature of the said mixture are increased.

This addition of heat from the outside may be carried out by means of a conventional reboiler R, or by direct addition of steam, or alternatively, ad specified hereinafter at paragraph (5) and shown in FIG. 3, it may be carried out by injecting a flow of hot solution coming from a lateral regeneration column, or steam produced by the expansion of the said solution.

(c) Finally, the mixture of steam and inert gases, whose steam content has been increased in the intermediate zone Zm, is conveyed to the uppermost regeneration zone Zs, where it is brought into contact with the exhausted solution coming from the absorption stage, in order to remove from the said solution the gaseous impurities previously absorbed.

As is clear from the preceding description the desorbing steam introduced into the upper zone Zs (which constitutes, in fact, the regeneration column proper) is not only that steam fed from outside into the intermediate zone Zm, but is also that which has been extracted and recovered by means of the inert gas in the lowest zone Zi.

In cases in which the provision of heat does not need to be greatly diminished, it is possible to eliminate the lowest zone Zi of the column and to introduce the inert gas at the bottom of the intermediate zone Zm, or through the reboiler, in such a way that the inert gas enters the latter together with the solution, which boils in its presence at a lower temperature than that corresponding to the pressure in the regeneration column. The solution therefore leaves the column at a lower temperature, achieving a still appreciable saving of heat.

(2) For a better understanding and practicising of the process of the present invention, reference will now be made to the diagram of FIG. 7, wherein the results of numerous experiments complemented by suitable calculations, are reported. In the said diagram:

On the abscissae are recorded the quantities of heat (expressed in kg of steam/m$^3$ of solution) which it is desired to use to obtain a predetermined degree of regeneration of the absorbing solution.

Thus, for example, a solution activated with glycine (of composition 250 g/l K$_2$O, 50 g/l glycine) is regenerated with 65 kg steam/m$^3$ solution so that it can purify, in the absorption step, a gaseous mixture up to a content of 0.05–0.1% of CO$_2$, at 25–30 atm., in a one-stage cycle. In a two-stage cycle, only 50 kg steam/m$^3$ total solution are sufficient for the same purpose.

The aforesaid quantities of steam comprehend both the heat provided by means of the reboiler R, and the heat extracted by the inert gas in the lowest zone Zi.

On the ordinates are recorded the quantities of steam (kg/m$^3$ solution) which the inert gases extract in the lowest zone Zi, producing the cooling of the solution shown in ° C. on the lateral ordinates on a different scale.

The curves of the diagram relate each to a different quantity of inert gases used shown in m$^3$ gas/m$^3$ solution while the dashed lines relate to the heat savings (%) realizable by the present process.

The diagram may be used as follows:

Using a one-stage cycle, as shown in FIG. 1, a degree of regeneration corresponding to 65 kg steam/m$^3$ solution (point A) is desired. A quantity of inert gases equal to 5 m$^3$ gas/m$^3$ solution (point B) is available. One reads on the ordinates (point C) that the heat recoverable is about 21.4 kg steam/m$^3$ solution (with cooling of the solution by about 12.5° C. — point D), whereby the quantity of heat to be provided by means of the reboiler R is 65 − 21.4 = 43.6 kg steam/m$^3$ solution. This represents a saving of 21.4/65 = 33%.

If the amount of inert gas available is equal to 10 or 15 m$^3$/m$^3$ solution, respectively, the saving in the provision of heat will be 48% and 57%, respectively.

When CO$_2$ is removed by means of a one-stage cycle using an alkali metal carbonate solution activated with glycine or the like, and assuming a unitary absorption of 30 m$^3$ CO$_2$/m$^3$ solution, the consumption of heat is 785, 607 and 504 Kcal/Nm$^3$ CO$_2$, respectively, when using 5, 10 and 15 m$^3$ of inert gases/m$^3$ of solution (instead of 1170 Kcal/Nm$^3$ CO$_2$ in the known art).

It is, in fact, evident from the aforesaid diagram that the quantity of heat recovered and the savings in the provision of heat are important, even with a modest supply of inert gases, and these increase rapidly with increase in the latter.

The application of the process of the present invention to a two-stage cycle is wholly analogous to its application to a one-stage cycle. It is sufficient in this case that the regeneration column of the second stage be subdivided into the said three zones, namely the uppermost, intermediate, and lowest zones.

In the case of a two-stage cycle the provision of heat in the conventional methods is perceptibly less, as stated previously, and may be further reduced by means of the present invention by 39%, 54% and 61%, respectively, when using respectively 5, 10 and 15 m$^3$ of inert gas/m$^3$ solution. A heat consumption of 660, 496 and 420 Kcal/Nm$^3$ CO$_2$, respectively, is then obtained instead of 1080 Kcal/Nm$^3$ CO$_2$ in the case of a conventional method (supposing a unitary absorption of 25 vol. CO$_2$/vol. solution).

(3) The heat saving which can be achieved by the present invention may be limited by the fact that the regenerated solution is cooled excessively by the extraction of heat, that is, to such an extent that it is returned to the top of the regeneration column at a temperature which is too low for adequate regulation of the thermal balance in the regeneration column.

These drawbacks can be avoided by using the following methods which, among others, further increase the advantages of the process of the invention.

the first method consists of increasing the working pressure in the regeneration column. The increase in pressure permits a large part of the water vapour normally discharged to the outside from the upper part of the regeneration column to be condensed, the heat thus recovered being delivered to the solution in the form of an increase in the temperature of the latter at the outlet from the regeneration column. This has been proposed in Belgian Patent Specification No. 811,138 and its Patent of Addition No. 836,122.

The second method consists of preheating and prehumidifying the flow of inert gases before passing the latter into the lowest zone Zi of the regeneration column, thus preventing the solution from being cooled excessively.

Figure 4:
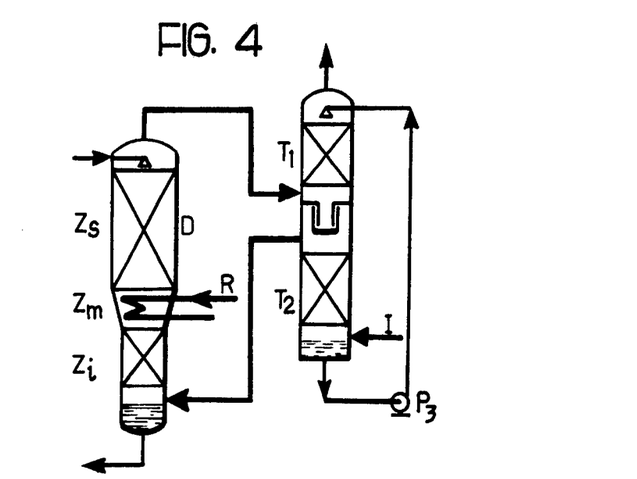

The embodiment shown in FIG. 4 is used for this purpose. With reference to FIG. 4, the gases leaving the top of the regeneration column D are conveyed to the column $T_1$, where they flow in countercurrent with water (circulated by the pump $P_3$) which is thus heated. These gases are then discharged to the outside.

The water thus heated is used in the lower column $T_2$ to prehumidify and preheat the flow of inert gases introduced at the base through piping I; these inert gases are then conveyed into the lowest zone Zi of the regeneration column and subsequently into the zone Zm (where heat is supplied from the exterior by means of the reboiler R) and into the zone Zs, as previously stated. The water is recycled by the pump $P_3$.

The method described above is very efficient, especially in the case in which the gases leaving the upper part of the regeneration column are very rich in steam, but also and primarily in cases in which a large quantity of inert gases is used as the desorbents.

This method may also be used alone, that is by passing the prehumidified and preheated inert gases directly into the intermediate zone Zm (not to the bottom of the zone Zi).

Figure 3:
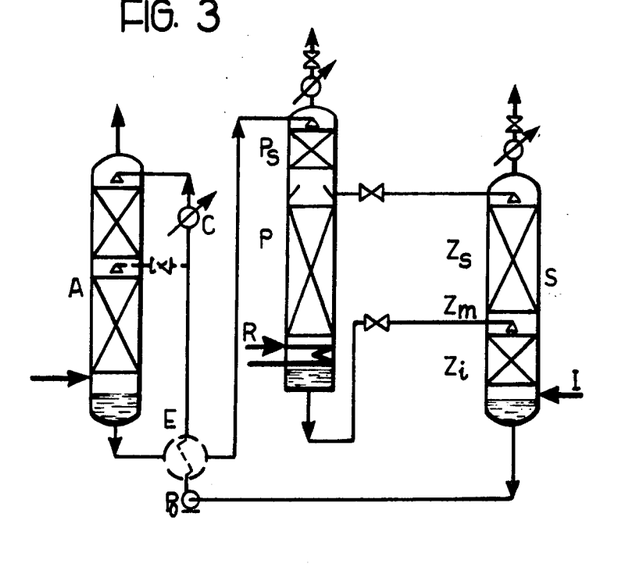

The system described above is applied to particular advantage when the present process is used in connection with the embodiment shown in FIGS. 1, 3 and 4 of the aforesaid Patent of Addition.

Figure 2:
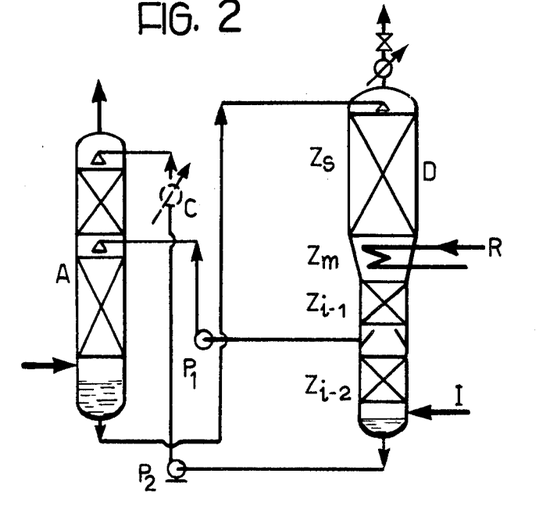

A third method consists of carrying out the treatment of the regenerated solution with the inert gases and consequent extraction of heat and cooling, not on the whole of the regenerated solution, but on a fraction of the latter, as shown in FIG. 2.

With reference to FIG. 2, the regeneration column D is composed, as in the preceding cases, of the uppermost zone Zs, the intermediate zone Zm, where heat is supplied from the exterior by means of the reboiler R and the lowest zone which is subdivided into two partial zones Zi-1 and Zi-2, and wherein a flow of inert gases is introduced at the bottom by means of pipe I.

As shown in FIG. 2, a fraction of the regenerated solution, lightly cooled in the zone Zi-1, is extracted from the bottom of this zone by means of the pump $P_1$ and is conveyed at an intermediate height into the absorption column A. The remaining fraction of the regenerated solution is cooled more vigorously, in a way adapted practically for the absorption, in the lower zone Zi-2, tapped from the latter by the pump $P_2$ and delivered to the top of the absorption column A.

By proportioning the two fractions of the solution conveniently, the cooler C may be practically eliminated. In this manner the present invention achieves the important advantage of using the heat, which in the prior art is wasted in cooling of the regenerated solution conveyed to the top of the absorption column, for the regeneration.

Figure 5:
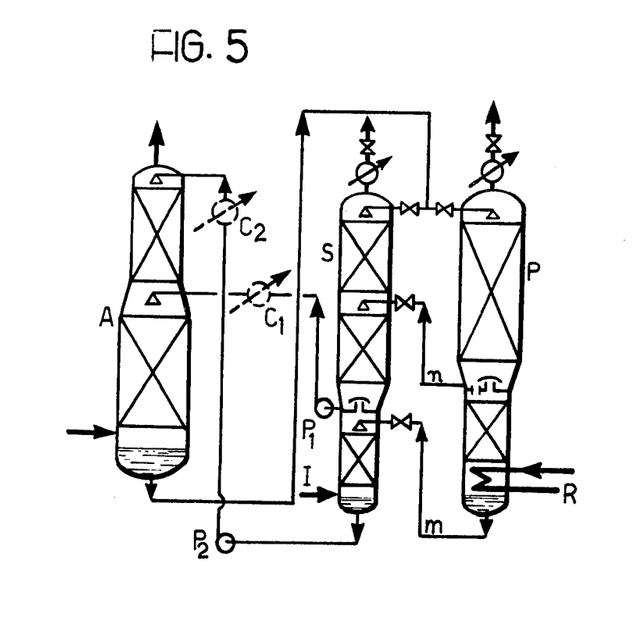

The aforesaid method is of direct use in the two-stage purification cycles — as shown in FIG. 5 — in which the inert gases exert their heat extracting action and cooling action only on the fraction of the solution circulated through the second stage, which, as is known, is about 20-30% of the total solution used in the purification cycle.

In the case of the use of a conventional type of purification cycle (that is with absorption at a lower temperature, conventional use of a heat-exchange between the regenerated solution and the exhausted solution and conventional interposition of a cooler) the embodiment of FIG. 2 allows the heat-exchange mentioned above to be noticeably reduced, generally by about 25-35%.

(4) The presence of the inert gases in the regeneration step, as is known, lowers somewhat the existing temperatures in the various regeneration zones.

It has been ascertained that this decrease in temperature brings about a decrease in effectiveness of the regeneration; this is due to the fact that, especially in the case of the absorption of $CO_2$, a lowering of the temperature lowers the dissociation constant of the bicarbonate (or of the carbamate) with consequent deterioration of the overall rate of desorption.

In order to avoid the aforesaid disadvantage, it is expedient to increase to some slight extent the working pressure in the regeneration column, so that the temperature remains effectively unchanged in comparison with the cases in which there is no inert gas present.

(5) In the present process the gases desorbed in the regeneration step are mixed with inert desorbing gases. This presents a disadvantage, particularly in cases of the removal of $CO_2$ in which a part at least of the desorbed $CO_2$ should be recovered in the pure state, in order to be used for the production of urea or dry ice.

This disadvantage is eliminated by means of the embodiment shown in FIG. 3, which among others, allows further advantages, especially due to the fact that, other conditions being left unchanged, smaller quantities of inert gas are needed.

In FIG. 3, the absorption column A operates as is known in the art, the solution being fed by means of the pump Po in split-stream or by the conventional method (through heat exchanger E and cooler C).

The exhausted solution leaving the absorption apparatus, after having flowed through the upper zone Ps of the main column P, is subdivided into two fractions, of which the first continues to descend within the column P and the second is conveyed to the top of the secondary column S. In the column P the solution is regenerated by means of the provision of external heat by the reboiler R; as a result the desorbed impurities are recovered in the pure state and may be used for the production of urea and similar purposes. The subdivision of the solution is regulated so as to obtain, by desorption, the quantity of $CO_2$ or other impurities which it is desired to obtain in the pure state.

The secondary column S is subdivided into three zones Zi, Zm, Zs, as specified previously in paragraph 1. Inert gas is introduced into the zone Zi through the pipe I, and flowing upwards cools and removes heat from the regenerated solution. In the zone Zm heat is supplied. In the embodiment shown, this supply of heat is obtained by conveying the regenerated solution of column P into the said zone Zm, whereby steam is produced by expansion or in any case heat is released by the solution. The gaseous mixture of inert gas and steam flows upwards through the zone Zs, regenerating the solution.

It is easy to see that the embodiment shown in FIG. 3, while allowing one part of the $CO_2$ — or of the other impurities — to be obtained in the pure state, affords a high efficiency of regeneration inasmuch as a part of the heat contained in the regenerated solution leaving column P is, whether directly or indirectly, released and used in the column S.

It is clearly expedient to operate under pressure in column P, so that a part of the steam which, in the known art is washed and discharged to the outside from the top of the regeneration column, is condensed to increase the temperature of the solution issuing at the bottom of the column itself, as indicated in the aforesaid Belgian Patent and its Patent of Addition. The solution which is thus under pressure and at a high temperature, is expanded in the zone Zm of the column S, producing steam, which is thus used in the secondary column S. However, in the zone Zm, if necessary, addition of further heat or steam may be effected.

After the expansion, the solution flows downwards through the lowest zone Zi of the column S, together with the regenerated solution coming from the zones Zs and Zm of the said column S, and part of the heat contained in both is recovered by the flow of inert gases and reused in the column S.

This embodiment is notably more convenient than that of FIG. 1, inasmuch as a smaller quantity of inert gas is needed for the same saving in the supply of heat.

In the cases, customary in the art, for the elimination of $CO_2$ or $CO_2$ + $H_2S$ the consumption of heat is reduced to about 500 Kcal/Nm$^3$ $CO_2$ by operating according to the embodiment of FIG. 3.

(6) The present process, as well as the one-stage cycles described above and shown in FIGS. 1, 2 and 3 may obviously be applied to two-stage cycles. FIG. 5 shows the most preferred application.

In this embodiment, the solution coming from the two-stage absorption column A is subdivided, as in the embodiment of FIG. 3, into two fractions, of which the first is conveyed to the two-stage regeneration column P in which regeneration is effected by provision of external heat and in which the desorbed impurities are consequently in the pure state and hence suitable for the production of urea and the like; the other fraction is conveyed to the two-stage secondary column S into which inert gases are passed. The percentage of solution delivered to column P is generally such as to obtain the required quantity of pure $CO_2$.

As shown in FIG. 5, the solution regenerated in the second stage of the main column is withdrawn and conveyed through the tube m to the second stage of the secondary column; the semi-regenerated solution in the first stage of the main column is withdrawn and conveyed through the tube n to an intermediate height of the first stage of the secondary column; into the upper part of the first stage of the secondary column is conveyed a fraction of the exhausted solution, as stated previously; at the bottom of the second stage of the secondary regeneration column a flow of inert gases is introduced through the pipe I. The flow of inert gases, as well as improving the degree of regeneration of the regenerated solution, also extracts part of the heat contained in the said solution, cooling it vigorously. The solution is subsequently withdrawn and, upon possible cooling in cooler $C_2$, is conveyed by the pump $P_2$ to the top of the second stage of the absorption column; the flow of inert gases continues its upward ascent, in countercurrent with the semi-regenerated solution coming from the first stage of the main column and subsequently with the secondary fraction of the exhausted solution coming from the absorption column; the semi-regenerated solution coming from the first stage of the main column and the secondary fraction of exhausted solution coming from the absorption column, after being passed into the secondary column, are withdrawn from the bottom of the first stage of the said column and, upon possible cooling in cooler $C_1$, are conveyed by the pump $P_1$ to the first stage of the absorption column.

In this way the quantity of solution conveyed into the column P is substantially reduced, with corresponding reduction in the heat supplied from the outside into this column P by the reboiler R, while the exhausted solution conveyed into column S is regenerated by the heat which the inert gases — and possible reduction in pressure — extract from the regenerated solution coming from P. Obviously, in this case also it is very suitable to operate under pressure in the main column P for the reasons explained previously.

In many cases, in the second stage of the secondary regeneration column S, it is convenient to provide a reboiler or other means for feeding heat from the exterior.

This second stage is hence subdivided into three zones; uppermost zone, at the top of which the solution coming from the second stage of the main column is introduced; intermediate zone, at the level of the reboiler; lowest zone, at the bottom of which is introduced the current of inert gases. All this is analogous to what is shown in FIGS. 1, 2 and 3 and for simplicity, is not shown in FIG. 5.

(7) The regenerative efficiency of the embodiments of FIGS. 3 and 5 is very high since, to the advantage derived from the recovering action of the inert gas, is added also the further advantage that the steam leaving the top of the column P is recovered and reused.

The saving afforded by the above embodiments is shown in the following Table 1, which relates to the case of removal of $CO_2$ by means of a glycine solution (composition: 250 g/l $K_2O$, 50 g/l glycine) and with the use of only 3.5 m$^3$ inert gas/m$^3$ solution.

Table 1

| Heat supplied to the reboiler of column P (kg vap/m$^3$ solution in P) | 45 | 50 | 55 | 65 | 70 | 75 |
|---|---|---|---|---|---|---|
| Percentage of the exhausted solution conveyed to the main column P (%) | 44.8 | 45.5 | 46.1 | 49.5 | 49.6 | 49.6 |
| Unitary loading (vol. $CO_2$/vol. solution) | 25 | 25 | 25 | 30 | 30 | 30 |
| Heat consumption (Kcal/Nm$^3$ $CO_2$) | 436 | 492 | 548 | 579 | 625 | 670 |

The data of Table 1 show that the aforementioned embodiments require heat consumptions which, with the embodiment of FIG. 1 (simple regeneration column) would correspond to a notably greater amount of inert gases than the 3.5 m$^3$/m$^3$ solution used in the case envisaged in Table 1.

(8) Further advantages derive from the fact that the inert gases also exert a desorbing action. In fact, whilst extracting heat from the regenerated solutions, they improve also the regeneration of the latter. This is made evident by suitable experiments in which an alkali metal carbonate solution activated with glycine is treated with a flow of inert gases at a rate of 5 m$^3$ inert gas per m$^3$ of solution.

The operating conditions and the degrees of carbonation obtained are summarized in Table 2.

Table 2

| Initial Temperature of the solution ° C | 101.5 | 101.5 | 101.5 | 101.5 | 101.5 | 101.5 |
|---|---|---|---|---|---|---|
| Final temperature of the solution ° C | 86.5 | 86.5 | 86.5 | 86.5 | 86.5 | 86.5 |
| Initial degree of carbonation of the solution % | 34.6 | 29.6 | 27.7 | 25.5 | 23.7 | 22.0 |
| Final degree of |

Table 2-continued

| carbonation of the solution % | 29.6 | 27.7 | 25.5 | 23.7 | 22.0 | 20.6 |
|---|---|---|---|---|---|---|

(9) The embodiment shown in FIG. 3 may conveniently be varied and modified with reference to what is indicated and claimed in the aforesaid Patent of Application with particular reference to FIGS. 1, 3 and 4 in the latter.

In FIGS. 1 and 3 of the said Patent of Addition, the solution coming from the main column P, operating under pressure, is expanded with release of steam, which is then used to regenerate (in self-regeneration) the solution itself from which it is evolved; in FIG. 4, the exhausted solution is first made to pass into the secondary column and subsequently is conveyed back, by means of a pump, into the main column.

The aforesaid two methods are used to advantage, in the present invention, with the sole precaution of adding a lowest zone Zi at the bottom of the secondary regeneration column, in which lowest zone the solution is treated with a current of inert gas introduced at the bottom of this zone, according to the fundamental teaching of the present invention.

(10) A particular application of the process of the present invention resides in its use in the case of a plant for the elimination of $H_2S$ or $CO_2 + H_2S$.

As is known, in these cases the so-called conventional cycle is used, in which the absorption is carried out at nearly ambient temperature, the hot regenerated solution being submitted to heat-exchange with the cold exhausted solution, which is thus preheated and conveyed to the regenerator; subsequently the said regenerated solution passes through a cooler and is carried back to the absorption column. It is also known that in the aforesaid cases solutions of MEA or DEA, Sulfolane and the like are preferably used. Activated potassium carbonate solutions, particularly solutions activated with glycine, may also be used for this purpose.

In such a case use is made of the regeneration column of FIG. 1 and possibly also that of FIG. 2, for carrying out the process of the invention.

In FIG. 1 the pressure of the regeneration column is increased so that the large quantity of steam, which in the known art is discharged and wasted at the top of the column, is recovered and used to increase the temperature of the solution issuing at the bottom of the uppermost zone Zs of the column. This is noted in the aforesaid Belgian Patent No. 811,138 and its Patent of Addition 836,122.

A combustible gas is passed into the lowest zone Zi as the inert gas. This gas is first conveyed into the regeneration column, facilitating the desorption of the $H_2S$, $CO_2$ and other gaseous impurities contained in the solution; subsequently the combustible gas charged with $H_2S$, $CO_2$ and other impurities is conveyed into a combustion furnace of the Claus type in which the $H_2S$ is transformed into elemental sulphur by partial combustion with air added for this purpose, while the combustible gas is burned, releasing heat and thus maintaining the furnace at the required temperature. In this way the present process affords the use of the aforesaid combustible gas for extracting heat from the regenerated solution in the lowest zone Zi, and its reuse in the regeneration column, thus reducing the consumption of external heat to a notable extent.

(11) A variation of the present method lies in the utilization of the small towers $T_1$ and $T_2$ shown in FIG. 4.

As already described at paragraph (3) — second method — the steam leaving the top of the regeneration column (which in this case must not necessarily operate under pressure) is conveyed to the upper tower $T_1$ and used therein to heat the water delivered by the pump $P_3$. This water, as well as being heated, also absorbs possible vapours of MEA, DEA etc., acting in the same manner as in the case of a reflux. Subsequently the heated water prehumidifies and preheats in the tower $T_2$ the inert gas (in this case the combustion gas for the Claus furnace) which thus carries back to the regeneration column the heat recovered at the top of the said column.

Figure 6:
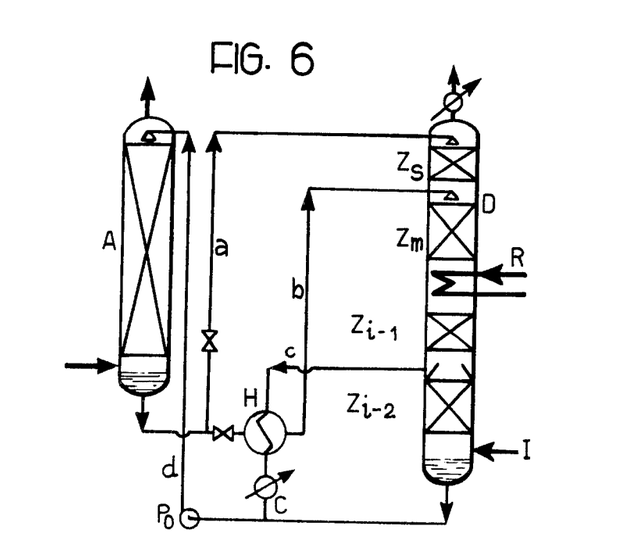

(12) FIG. 6 shows an embodiment of the process of the present invention, which is very convenient when the absorption is effected at ambient temperature, or at least upon cooling of the solution, and when, as is known, a heat exchange is effected between the exhausted solution and the regenerated solution, with further cooling of the latter. This cycle, called "conventional," is usual in the case of ethanolamine solutions and the like, but is also frequently used for all other types of solution.

The exhausted solution exited from the absorption column A, is subdivided into two fractions. The first fraction is conveyed cold, through the tube a, to the top of the regeneration column D; the second, instead, is conveyed to the heat exchanger H and hence conveyed, through the tube b, to an intermediate height in the said column D. As shown in FIG. 6, the regeneration column D is composed, as in the preceding cases, of an uppermost zone Zs, an intermediate zone Zm, where heat is provided from the exterior by means of the reboiler R, and a lowermost zone subdivided into two partial zones Zi-1 and Zi-2. A current of inert gases is introduced at the bottom of zone Zi-2 through the pipe I. A fraction of the regenerated solution, lightly cooled in the zone Zi-1 is withdrawn from the bottom of the latter and conveyed directly through the tube c to the heat exchanger H and is subsequently cooled in the cooler C; the remaining fraction of the solution is treated further and cooled in the lower zone Zi-2; the two fractions of the regenerated solution are combined and carried back to the absorption column A by the pump Po and the pipe d.

The advantages of the embodiment of FIG. 6 are very important, especially if the regeneration is carried out at a pressure greater than atmospheric, as described in the aforesaid Belgian Patent. In the first place the cool fraction of the solution conveyed through the tube a to the top of the regeneration column, absorbs, because of its low temperature, almost all the steam issuing at the top together with the desorbed impurities, thus permitting the conventional cooling effected at the top of the said column to be substantially reduced. In the second place the heat exchanger H and the cooler C are of a smaller size, since only a part (60–70%) of the total solution is passed through the latter.

(13) According to a further embodiment of the process of the invention, the inert gases, before being brought into contact with the regenerated solution in the lowest zone Zi of the regeneration column, are previously used to degas boiler feed water. It should be noted in this connection that in the conventional methods the residual heat available in the plant for eliminating the $CO_2$ or other similar impurities, is used to preheat the water feeding a boiler (for example the boiler of the plants for reforming, synthesis of $NH_3$, etc.). The water thus preheated is then submitted in a degassing apparatus to a treatment with steam to remove the impurities such as oxygen, $CO_2$ and the like, as is necessary in the art.

In the process of the invention, the degassing of the water feeding the boiler may be carried out with greater economy and greater simplicity by treating the water feeding the boiler also with a current of inert gas in the degassing apparatus mentioned above.

(14) Finally, the inert gases, after being brought into contact with the regeneration solution in the lowest zone $Zi$ of the regeneration column, may be withdrawn at least in part and discharged externally, before reaching the intermediate zone $Zm$, given that the inert gases themselves exert a desorbing action. In other cases, these inert gases may conveniently be conveyed to an intermediate height of the uppermost zone $Zs$.

EXAMPLE 1

This Example illustrates the embodiment of FIG. 1.

A gaseous mixture containing 24.2% $CO_2$ is fed at a rate of 136,800 $Nm^3/hr$, at a pressure of 27.5 atm. and a temperature of 125° C. into the absorption column, and treated with an absorbing solution of alkali metal carbonate activated with glycine (250 g/l $K_2O$ and 50 g/l glycine). The regenerated solution is introduced partly at the top of the absorption column at a temperature of 65° C., at a rate of 385 $m^3/hr$, and partly at an intermediate height at a temperature of 104° C. and at a rate of 717 $m^3/hr$.

The exhausted solution withdrawn from the absorption column at 108° C. is conveyed to the regeneration column subdivided into 3 zones, uppermost, intermediate and lowest. The regeneration column operates at a pressure of 2.35 atm. at the bottom of the intermediate zone, where the boiling point of the solution is 124.5° C. A current of 13,200 $Nm^3/hr$ of inert gases (in this case impure nitrogen resulting from a washing process with liquid nitrogen), corresponding to 12 volumes of nitrogen per $m^3$ sol., is conveyed to the bottom of the lowest zone. As a result, referring to the diagram of FIG. 7, the solution is cooled from 124.5° C. to 104° C. in this zone by the nitrogen which extracts 35 Kg of steam per $m^3$ of solution. The resulting gaseous mixture, containing 78.5% steam and 21.5% nitrogen, flows upwards through the intermediate zone where external heat is supplied in an amount of 35 kg/$m^3$ sol. Consequently in the uppermost zone the solution is regenerated by a heat supply corresponding to 70 kg steam/$m^3$ solution (of which 35 are recovered from the regenerated solution in the lowest zone and 35 are supplied from the outside) and by means of the desorbing effect of the nitrogen (corresponding to 9.5 kg steam/$m^3$ solution). Under these conditions the $CO_2$ content drops to 0.05% in the gas exited from the absorption column. The consumption of heat provided from the outside is 630 Kcal/$Nm^3$ $CO_2$.

EXAMPLE 2

The gaseous mixture to be treated is the same as in Example 1 but in this case it is desired to obtain 16,530 $Nm^3/hr$ of $CO_2$ (50% of the total) in the pure state. The absorption column operates under the conditions shown in Example 1. The exhausted solution withdrawn from the said absorption column at a temperature of 108° C. is subdivided into two equal fractions with a delivery rate of 551$m^3/hr$, and these are respectively conveyed to two separate regeneration columns, namely a main one P and a secondary one S which operate in parallel. In column P the solution is regenerated by provision of heat from the outside equivalent to 70 kg steam/$m^3$ solution, the pressure being of 2.4 atm. at the bottom of the column and the boiling point 129° C.

The column S is subdivided into three zones, uppermost, intermediate and lowermost and operates at a pressure of 1.2 atm. at the bottom of the intermediate zone, the solution having at this level a boiling point of 108° C. The principal solution regenerated and at 129° C. is conveyed into the intermediate zone of the said column where it expands producing steam and cooling to 108° C. This steam is equivalent to 36 kg steam/$m^3$ principal solution and hence equal also to 36 kg steam/$m^3$ secondary solution.

The combined principal and secondary solutions flow downwards through the lowest zone of the column S, at the bottom of which is introduced a current of 3,850 $Nm^3/hr$ of inert gases, equivalent to 3.5 volumes of inert gas/$m^3$ combined solutions.

Figure 7:
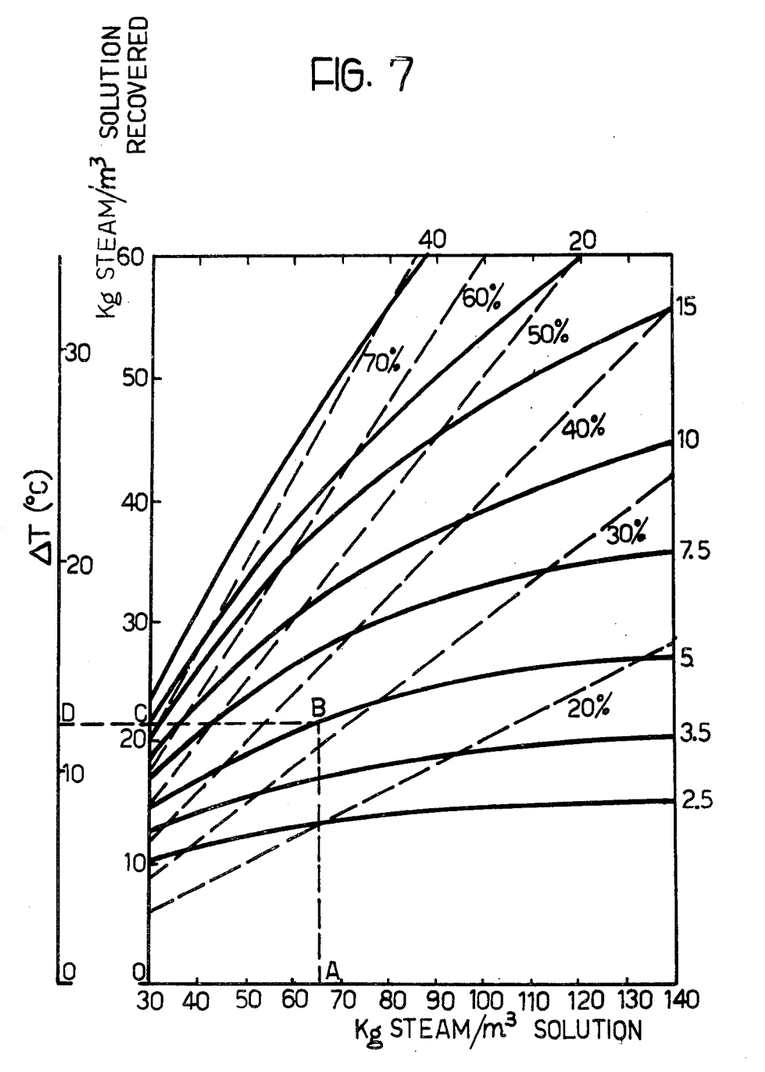
FIG. 7 is an explanatory diagram.

Consequently, referring to the diagram of FIG. 7, in this zone the solution is cooled from 108° C. to 98° C. by the inert gas which extracts a flow of steam, in an amount equivalent to 17 kg steam/$m^3$ total solution, and thus equivalent to 34 kg steam/$m^3$ secondary solution. Therefore in the uppermost zone of the column S the solution is regenerated by 70 kg steam/$m^3$ solution, and thus, even disregarding the desorbing effect of the nitrogen, is regenerated as in column P. Under these conditions the $CO_2$ content drops to 0.05% in the gas exited from the absorption column. The consumption of heat supplied from the outside is 630 Kcal/$Nm^3$ $CO_2$, as in the Example 1, with the advantage however, that the consumption of inert gas is lowered to 3.5 volumes/$m^3$ total solution and that half of the $CO_2$ is recovered in the pure state.

EXAMPLE 3

The gaseous mixture to be treated is the same as in Example 1, but in this case it is desired to obtain 19,840 $Nm^3/hr$ of $CO_2$ (60% of the total) in the pure state. The procedure is the same as in Example 2, but the regenerator P is subdivided into an upper and a lower zone. All the exhausted solution (1102 $m^3/hr$) is conveyed to the upper zone of the regeneration column P, at the outlet from which the solution regenerated from the degree of 77.5% carbonation to 67.5% carbonation, is subdivided in the same way as Example 2, again into two equal fractions. The first descends into the lower zone of the column P, and the second is conveyed into the uppermost zone of the column S. The consumption of heat provided from the outside is 630 Kcal/$Nm^3$ $CO_2$.

EXAMPLE 4

This Example illustrates the embodiment of FIG. 2.

A recycle gas in an ethylene oxide production process is to be purified by means of an absorbing solution of alkali metal carbonate (200 g/l $K_2O$). The gaseous mixture having a 10% $CO_2$ content, is delivered to the absorption column at a rate of 46,000 $Nm^3/hr$, at a pressure of 22 atm. and at a temperature of 50° C.; a purification correspond to 1.5% $CO_2$ in the mixture exited from the absorption column is required. The solution introduced at the top of the absorption apparatus at a rate of 232 $m^3/hr$ and at a temperature of 75° C. and exited at 76.5°

C., is subdivided into two fractions. The first one (90 m³/hr) is regenerated using an external provision of heat of 64 kg steam/m³ solution in the main regeneration column P, in order to obtain pure $CO_2$, and the second (142 m³/hr) is regenerated with 64 kg steam/m³ solution in a secondary regeneration column S subdivided into three zones, uppermost, intermediate and lowest. The heat supplied to the column S for regeneration is wholly recovered heat. A part (46 kg steam/m³ solution) is extracted from the solution by a current of inert gas, in this case air. The principal solution withdrawn from the column P at 103° C. is combined with the secondary solution in the intermediate zone of the column S. In this zone the solutions heat a current of air introduced at the bottom of the lowest zone of the regenerator S at a rate of 5,700 m³/hr, cooling to 75° C. This air, preheated to 74° C. in the small towers $T_1$ and $T_2$ for recovery of the heat leaving the head of the column S with the $CO_2$, as shown in FIG. 4, carries within itself an amount heat equivalent to 18 kg steam/m³ solution. Therefore in the uppermost zone of the column S the solution is regenerated with 64 kg steam/m³ solution, to which is added the desorbing action of the air which corresponds to about 30 kg steam/m³ solution. The consumption of heat supplied from the outside is 780 Kcal/Nm³ $CO_2$. The $CO_2$ desorbed in the main regenerator is 1541 m³/hr.

EXAMPLE 5

A gaseous mixture containing 18% $CO_2$ and 2% $H_2S$ is purified in an absorption column by a 25% monoethanolamine solution. The solution leaving the absorption column contains 25 vol/vol of $CO_2$ + $H_2S$/m³ solution and is at a temperature of 65° C. This solution is preheated to 98° C. in the usual heat exchanger and is introduced at 98° C. at the top of the regeneration column which, as stated previously, consists of three zones, lowest, intermediate, and uppermost. The column operates at a pressure of 1.95 atm., the corresponding boiling point in the intermediate zone being 121.6° C. The solution is cooled to 108° C. by a current of combustible gas equal to 4.5 m³/m³ solution and is subsequently conveyed to a heat exchanger and then to a cooler which cools it to 40° C. so that it can be conveyed to the absorption column. The current of combustible gas cools the solution in the lowest zone from 121.6° C. to 108° C., as stated above, extracting 23.5 kg of steam per m³ of solution. The reboiler of the intermediate zone is supplied with a further 76.5 kg steam/m³ solution, the overall amount being thus of 100 kg steam/m³ of solution. This quantity of steam is that needed, as is known, for the regeneration of the monoethanolamine solution in the lowest part of the regeneration column.

The combustible gas exited from the top of the regeneration column contains 44.55% of $CO_2$, 4.95% of $H_2S$, 41.59% of $H_2O$ and 8.91% of combustible gas. Upon possible admixture with further combustible gas and possible cooling, the said combustible gas is conveyed to a Claus furnace.

The consumption of heat is 1650 Kcal/Nm³ $CO_2$ + $H_2S$, that is 24.5% less than the usual consumption in the conventional methods.

We claim:

1. In a method for the removal of gaseous impurities chosen from the group consisting of $CO_2$, $H_2S$, HCN and $SO_2$ from a gaseous mixture, including an absorption step in which said gaseous mixture is brought into contact with an aqueous, alkaline scrubbing solution chosen from the group consisting of alkali metal carbonate solutions; alkali metal carbonate solutions activated by the addition of glycine or other aminoacids, $As_2O_3$, ethanolamine or salts of boric acid; solutions of alkali metal phosphates, borates, sulfites and bisulfites and solutions of ethanolamine in water or sulfolane, which absorption step results in said impurities being absorbed in the scrubbing solution to provide an exhausted scrubbing solution, and a regeneration step carried out at elevated temperature in which the resulting exhausted scrubbing solution is regenerated by delivering it to a regeneration column having an upper part and a lower part, the exhausted scrubbing solution being delivered to the upper part of the regeneration column while supplying heat from the exterior to the lower part of said column, the exhausted scrubbing solution flowing from the upper to the lower part of said regeneration column, the improvement which comprises delivering regenerated scrubbing solution issuing from the lower part of said regeneration column to a zone operating at the same pressure as said regeneration column, contacting said regenerated scrubbing solution in said zone with a stream of inert gas to enrich the stream of inert gas in heat and steam, delivering the thus treated inert gas to the lower part of said regeneration column and passing said inert gas in countercurrent flow with regenerating exhausted scrubbing solution through the lower part and upper part of the regeneration column, thereafter discharging from the upper part of the regeneration column a mixture of inert gas, steam and desorbed impurities.

2. The method of claim 1, in which said absorption step comprises an absorbing column subdivided into a first and a second stage.

3. The method of claim 1, in which said regeneration step is carried out at superatmospheric pressure.

4. The method of claim 1, in which gas gaseous impurities consists mainly of $H_2S$ and said current of inert gases is a current of cumbustible gas, which desorbs the $H_2S$ contained in the solution, forming a mixture of $H_2S$ and combustible gas which is withdrawn from the top of the regeneration step and conveyed to a combustion furnace in which the $H_2S$ is transformed into elemental sulfur.

5. The method of claim 1, in which said upper part and said lower part of said regeneration column are separate and distinct from each other.

6. The method of claim 1, in which at least a part of said current of inert gas is extracted from said zone and conveyed to an intermediate height of said upper part of said regeneration column.

7. The method of claim 1, in which the gaseous mixture leaving the top of the regeneration column is brought into contact with water which is thus heated; the heated water thus obtained is brought into contact with the current of inert gases which is thus preheated and prehumidified; and the said inert gases are the conveyed into the regeneration column.

8. In a process for the removal of gaseous impurities chosen from the group consisting of $CO_2$, $H_2S$, HCN and $SO_2$ from a gaseous mixture containing the same, comprising an absorption step in which the gaseous mixture is brought into contact with an aqueous, alkaline scrubbing solution chosen from the group consisting of alkaline metal carbonate solutions; alkaline metal carbonate solutions activated by the addition of glycine or other amino acids, $As_2O_3$, ethanolamine or salts of boric acid; solutions of alkali metal phosphates, borates, sulfites and bisulfites and solutions of ethanolamine in water or sulfolane, which absorption step results in the impurities being absorbed in the scrubbing solution to provide an exhausted scrubbing solution, and a regeneration step carried out at an elevated temperature in which the resulting exhausted scrubbing solution is regenerated by splitting the exhausted scrubbing solution into a main exhausted scrubbing solution fraction and a secondary exhausted scrubbing solution fraction, the main exhausted scrubbing solution fraction being regenerated in a main regeneration column by heat supplied from the outside thereof, whereby the impurities therein are desorbed in the pure state and discharged from the top of the main regeneration column and regenerated main scrubbing solution is discharged from the bottom of the main regeneration column, the secondary exhausted scrubbing solution fraction being regenerated in a secondary regeneration column having an upper part and a lower part, the secondary exhausted scrubbing solution fraction being delivered to the upper part of the secondary regeneration column while supplying heat from the exterior thereof to the lower part of the secondary regeneration column, the secondary exhausted scrubbing solution fraction flowing from the upper to the lower part of the secondary regeneration column, wherein the regenerated main scrubbing solution fraction discharged from the bottom of the main regeneration column is conveyed to the lower part of the secondary regeneration column, releasing therein part of the heat it possesses and being combined with the secondary exhausted scrubbing solution fraction to yield a combined fraction which is discharged from the bottom of the secondary regeneration column as combined regenerated scrubbing solution and recycled to the absorption step, the improvement which comprises prior to said recycle the combined regenerated scrubbing solution issuing from the lower part of the secondary regeneration column being delivered to a zone operating at the same pressure as the secondary regeneration column, wherein the combined regenerated scrubbing solution is contacted in said zone with a stream of inert gas to enrich the stream of inert gas in heat and steam, the thus treated inert gas then being introduced into the lower part of the secondary regeneration column and passed in countercurrent flow through the lower and upper part of the secondary regeneration column contacting with the combined fraction and then with the secondary exhausted scrubbing solution fraction to provide a mixture of inert gas, steam and desorbed impurities, thereafter the mixture of inert gas, steam and desorbed impurities being discharged from the upper part of the secondary regeneration column.

9. The method of claim 8, in which said absorption step is affected in an absorbing column subdivided into a first and a second stage and wherein the main regeneration column is subdivided into a first and a second stage and wherein the secondary regeneration column is also subdivided into a first and a second stage; said second stage of said secondary regeneration column comprising upper and lower zones.

10. The method of claim 8, in which said main regeneration column is operated at a pressure greater than that of the secondary regeneration column.

11. The method of claim 8, in which said secondary regeneration column is operated at superatmospheric pressure.

12. The method of claim 8, in which said gaseous impurities consist mainly of $H_2S$ and said current of inert gases is a current of combustible gas which desorbs the $H_2S$ contained in the exhausted secondary scrubbing solution, forming a mixture of $H_2S$ and combustible gas which is withdrawn from the top of the secondary regeneration column and conveyed to a combustion furnace in which the $H_2S$ is transformed into elemental sulphur.

13. The method of claim 8, in which said upper and lower zones are separate and distinct from each other.

14. The method of claim 8, in which said current of inert gases, after having traversed said lower zone, is at least partly discharged to the exterior.

15. The method of claim 8, in which said current of inert gases is extracted at least partly from said lower zone and conveyed to an intermediate height in said upper zone.

16. The method of claim 8, in which the gaseous mixture leaving the top of the regeneration column is brought into contact with water which is thus heated; the heated water thus obtained is brought into contact with the current of inert gases which is thus preheated and prehumidified; and the said inert gases are then conveyed into said secondary regeneration column.

17. In a method for the removal of gaseous impurities chosen from the group consisting of $CO_2$, $H_2S$, HCN and $SO_2$ from a gaseous mixture, including an absorption step in which said gaseous mixture is brought into contact with an aqueous, alkaline scrubbing solution chosen from the group consisting of alkali metal carbonate solutions; alkali metal carbonate solutions activated by the addition of glycine or other amino acids, $As_2O_3$, ethanolamine or salts of boric acid; solutions of alkali metal phosphates, borates, sulfites and bisulfites and solutions of ethanolamine in water or sulfolane, and a regeneration step carried out at elevated temperature in which the said impurities, absorbed in the resulting exhausted absorbing solution, are stripped from the latter, the improvement which comprises:

(a) said regeneration step comprises three zones, uppermost, for the heating and desorbing of said exhausted absorbing solution of (f), intermediate for the introduction of exterior heat of (e) and lowest for the heat recovery of (d) respectively, operating substantially at the same pressure;

(b) said exhausted solution is conveyed into the uppermost zone and subsequently into said intermediate and lowest zones;

(c) a current of inert gases is conveyed into the bottom of said lowest zone and subsequently into said intermediate and upper zones;

(d) in said lowest zone said current of inert gases desorbs the residual impurities still contained in said solution and extracts and recovers part of the heat contained in said solution, forming a gaseous mixture of steam, impurities and inert gases, the thus cooled solution exiting from the lowest zone being recycled to the absorption step;

(e) in said intermediate zone heat is supplied from the exterior, increasing the heat content of the gaseous mixture of (d);

(f) the gaseous mixture of (e) is conveyed into said uppermost zone and brought into contact with said exhausted solution, desorbing said impurities contained therein and heating the exhausted solution;

(g) said inert gases, together with said desorbed gaseous impurities are withdrawin from the top of said uppermost zone and discharged to the exterior.

* * * * *